United States Patent [19]

Lagain

[11] 3,779,121
[45] Dec. 18, 1973

[54] SHEET MATERIAL CUTTING APPARATUS

[76] Inventor: Georges Lagain, 3, rue des Sorbiers, Ermont, France

[22] Filed: July 16, 1971

[21] Appl. No.: 163,273

[30] Foreign Application Priority Data
July 21, 1970    France ............................. 7026865

[52] U.S. Cl. ........................ 83/614, 83/639, 29/419
[51] Int. Cl. .............................................. B26b 5/12
[58] Field of Search ..................... 83/485, 487, 614, 83/639

[56] References Cited
UNITED STATES PATENTS

| | | | |
|---|---|---|---|
| 3,088,355 | 5/1963 | Hornbostel, Jr. | 83/614 X |
| 3,277,761 | 10/1966 | Dreher | 83/614 |
| 3,213,735 | 10/1965 | Keferstein et al. | 83/614 X |
| 3,137,192 | 6/1964 | McNeill | 83/614 X |

*Primary Examiner*—Andrew R. Juhasz
*Assistant Examiner*—John Sipos

*Attorney*—Stevens, Davis, Miller & Mosher

[57]    ABSTRACT

This invention relates to apparatus for cutting sheet material, particularly material in sheath form for manufacturing bags. A cutting blade is detachably secured to a movable member which is arranged for movement over a rectilinear guide member that is fixed to a support, and this movable member is constituted by a double piston which is mounted to slide in a tube. The tube is shaped to offer at each of its ends a cylinder which forms, with the adjacent face of the piston, a chamber of varying size arranged to be supplied with operating fluid under pressure, through at least one conduit that discharges into the chamber. In one form, the tube is longitudinally slotted to receive a part of the movable member and this part extends outside the tube and carries the cutting blade. In another form, the guide member is constituted by a rail on which slides a carriage that comprises the movable member and carrying the double piston for alternate engagement by its two ends in two cylinders that are arranged at the two ends of the rail.

5 Claims, 4 Drawing Figures

PATENTED DEC 18 1973 3,779,121
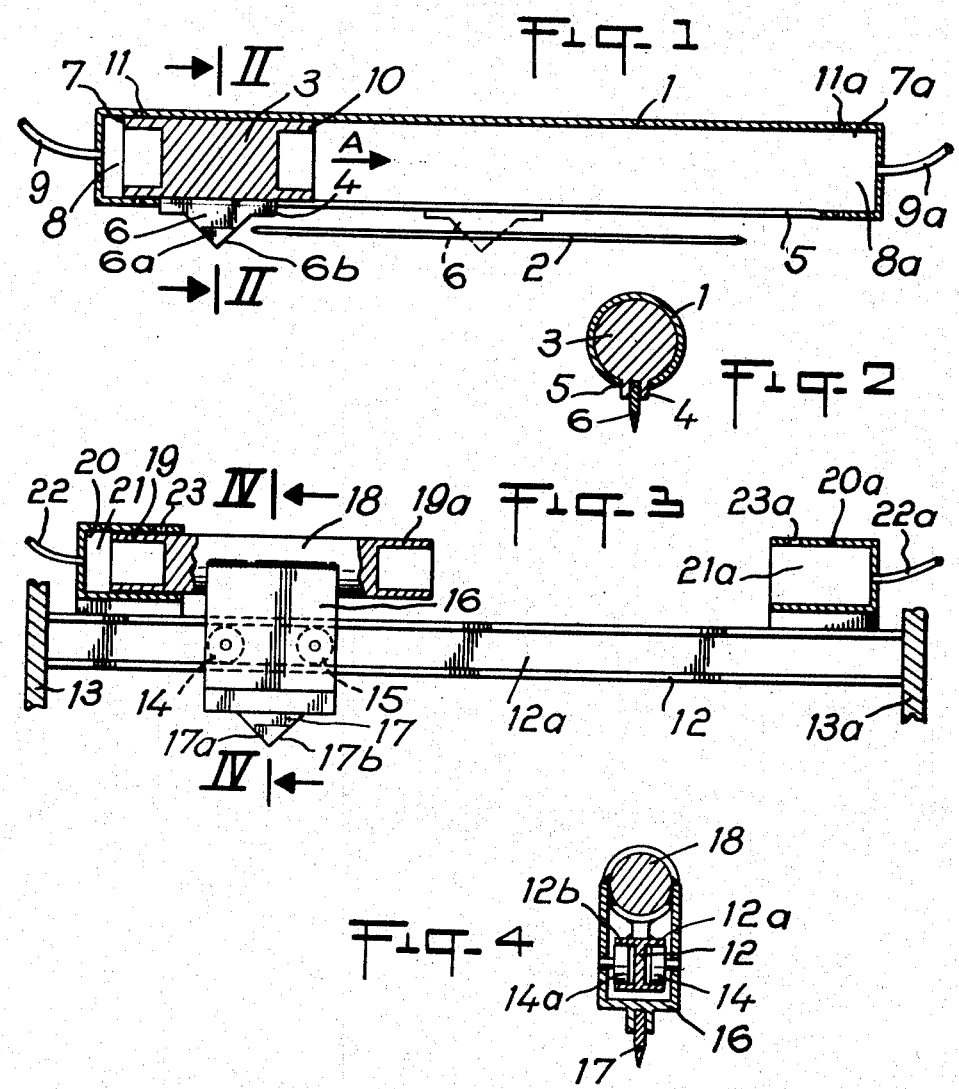

SHEET MATERIAL CUTTING APPARATUS

The present invention relates to apparatus for cutting sheet material.

Various devices are known for cutting sheet material, more particularly a sheath of plastics material used for manufacturing bags.

One such device comprises a guillotine which includes a blade extending over the entire length of the sheet to be cut, but difficulties are encountered concerning adjustment and this device necessitates accurate mechanics, and frequent and tiresome sharpening as a result of which both the cost and the maintenance charges are high.

Moreover, the blade is situated close to heating elements, so that there are heat-insulation problems to avoid possible deformations of the blade.

Similarly, a cutting device is known wherein a cutting blade is used, that is secured to an endless belt or tape driven by pulleys over which it passes.

Moreover, such a device causes difficulties as regards accurate guiding of the blade, so that the cut is not always reliably straight and, moreover, depends on the quality of the belt. It is an object of the invention to provide a cutting apparatus particularly for cutting a sheet of plastics material, whch avoids or minimises the above-enumerated disadvantages. To fulfil this and other important objects, the invention proposes a cutting apparatus which comprises a support, a rectilinear guide member fixed to said support, a movable member arranged for movement over said rectilinear guide member, a cutting blade detachably secured to said movable member, said movable member being constituted by a double piston mounted to slide in a tube shaped to offer at each end thereof a cylinder forming with one of the faces of said piston, a chamber of varying size arranged to be supplied with an operating fluid under pressure through at least one conduit discharging into said chamber.

This apparatus offers the main advantage that it is usable both for small and large lengths of material to be cut. It enables a cut to be obtained at constant speed and accurate guiding from which very little wear results.

On the other hand, the blade, having two cutting edges and effecting a reciprocating movement, ensures a longer life and less frequent replacements.

Furthermore, since the apparatus according to the invention is very simple to produce, its cost price is not high.

Other characteristics and advantages of the invention will be better understood from a study of the description which follows, and by referring to the accompanying drawings relating to certain embodiments, and in which:

FIG. 1 shows a view in longitudinal section of one embodiment of a pneumatically-controlled cutting apparatus according to the invention, FIG. 2 shows a view in cross-section along the line II—II of FIG. 1;

FIG. 3 shows a view in elevation and in section of another embodiment of a pneumatically-controlled cutting device according to the invention, and FIG. 4 shows a view in cross-section along the line IV—IV of FIG. 3.

Referring now to the drawings, FIGS. 1 and 2 show an embodiment of a cutting apparatus according to the invention which comprises a tube 1 extending over a length greater than the width of a sheath 2 which it is desired to cut, and a movable member formed by a double piston 3 mounted to slide in the said tube 1. The movable member formed by the double piston 3 has an extension 4 extending outside the tube through a slot 5 running over the greater part of the length of the tube and which ensures longitudinal guiding of the member 3.

A cutting blade 6 having two cutting edges 6a, 6b is mounted by any known means on this extension 4 of the piston member 3.

Each end the tube 1 is shaped to present a cylinder 7, 7a forming with the adjacent one of the faces of the double piston 3 a compression chamber 8, 8a of variable size arranged to be supplied with a compressed fluid such as air through conduits 9, 9a discharging into the said chamber.

The piston 3 may have a compression chamber such as 10 on its two opposing faces.

During admission of compressed fluid into the chamber 8, the piston 3 receives an instantaneous thrust which imparts a predetermined speed thereto and drives it in the direction of the arrow A; the thrust must be sufficient to ensure displacement of the piston and of the blade which it carries, over the entire length of the tube 1, so as to cut the sheath 2 during its travel.

As soon as the piston 3 is engaed by its other end in the cylinder 7a, the fluid such as air contained in the chamber 8a is compressed and causes pneumatic braking of the moving member or piston 3. However, in order to avoid bounce of the piston 3, orifices such as 11, 11a are provided in the cylinders 7 and 7a, which ensure progressive evacuation of the air and a gradual slowing down of the moving assembly.

During the supply of the compressed fluid to the chamber 8a, the same phenomenon occurs and the piston 3 as well as the blade 6 are driven in the direction opposite that of arrow A for a new cutting operation.

FIGS. 3 and 4 show a modification of this apparatus, which comprises a rail 12 fixed by both its ends to support member 13, 13a, and having two opposite grooves 12a, 12b wherein are engaged two pairs of wheels 14, 15 and 14a, 15a, which are mounted to rotate on a movable member in the form of a carriage 16. The lower part of the carriage 16 is provided with a cutting blade 17 similar to that described above in relation to FIGS. 1 and 2, and having two cutting edges 17a, 17b.

A double piston 18 is fixed to the upper part of the carriage, having two opposite chambers 19, 19a and intended to be engaged alternately in two cylinders 20, 20a respectively fixed adjacent the two ends of the rail 12.

The cylinders 20 20a form with the two faces of the piston, chamber 21, 21a of variable size which are supplied with compressed fluid through conduits 22, 22a the said cylinders having vent holes 23, 23a for the air to escape.

The operation of this embodiment of the apparatus will be apparent from the described operation of the embodiment of FIGS. 1 and 2.

Naturally, various modifications may be made by the man skilled in the art to the apparatus described above by way of non-limiting examples, without departing from the scope of the invention, as defined by the appended claims.

I claim:

1. An apparatus for cutting sheet material comprising a support, a rectilinear guide member fixed to the support, a cylinder disposed above the guide member, a double piston slidably disposed in the cylinder, a cutting blade carried by the piston, means for admission of fluid under pressure into each end of the cylinder, and separate means for the escape of fluid through a sidewall of the cylinder near each end thereof whereby a compression chamber is provided each side of the piston in the cylinder.

2. Apparatus according to claim 1, whrein said tube is longitudinally slotted over the greater central part of said tube and therein is engaged a part of said movable member, said part extending outside said tube and bearing said cutting blade.

3. Apparatus according to claim 1, wherein said guiding member is formed by a rail on which a carriage is mounted to slide, said carriage constituting said movable member and carrying said double piston for engagement alternately by its two ends in two cylinders arranged at the two ends of said rail, said cylinders being arranged to be supplied with said fluid under pressure through said at least one conduit discharging into said cylinder.

4. Apparatus according to claim 3, wherein said rail has two opposite grooves wherein are engaged at least two guide runners connected to said carriage.

5. Apparatus according to claim 4, wherein said movable member comprises two pairs of opposite wheels engaged in said grooves in said guide rail.

* * * * *